United States Patent Office 2,906,781
Patented Sept. 29, 1959

2,906,781

HYDROHALOGENATION OF STYRENE COMPOUNDS

Robert S. Montgomery, Midland, Mich., assignor to The Dow Chemical Company, Midland, Mich., a corporation of Delaware No Drawing. Application September 19, 1957
Serial No. 684,837

9 Claims. (Cl. 260—651)

This invention relates to the hydrohalogenation of styrene compounds, i.e. to the chemical interaction of a hydrogen halide with compounds in which a vinyl group is attached to a carbon atom of an aromatic nucleus. It particularly pertains to the preparation of haloethyl aromatic compounds by the addition of hydrogen chloride or hydrogen bromide to a styrene compound in the presence of an insoluble solid catalytic material comprising a copper chloride or a copper bromide, whereby the rate of chemical interaction of the reactants is greatly increased.

As used herein, the term "halogen" will be understood to mean chlorine or bromine, the term "halide" will be understood to mean chloride or bromide, and the term "hydrohalogenation" will be understood to mean hydrochlorination or hydrobromination.

This application is a continuation-in-part of my copending application, Serial Number 419,569, filed March 29, 1954, now abandoned.

It is known that hydrogen chloride reacts with liquid monomeric styrene to form chloroethylbenzene, presumably 1-chloroethylbenzene. Other vinyl aromatic compounds react similarly to form the corresponding chloroethyl aromatic compounds. In the manufacture of 1-chloroethylbenzene it is customary to bubble hydrogen chloride into a quantity of liquid monomeric styrene at approximately room temperature. The process is not altogether satisfactory because the rate of chemical interaction of the hydrogen chloride and the styrene is slow, considerable time is required to complete a batch, and a wasteful excess of hydrogen chloride is ordinarily employed. The reaction rate can be increased to some extent by operating at elevated temperatures but with greater hazard and at the risk of forming objectionable proportions of styrene polymer. The reaction rate can also be increased to some extent by operating under superatmospheric pressure but at the cost of more expensive equipment, increased corrosion, and other undesirable consequences.

It has now been discovered that the rate of chemical interaction of hydrogen chloride, or of hydrogen bromide, and liquid monomeric styrene compounds such as styrene can be greatly increased by contacting the reactants with a solid, insoluble, catalyst body containing a copper halide. The solid catalyst material can be dispersed through a quantity of liquid styrene and hydrogen chloride or hydrogen bromide bubbled therethrough in conventional manner, or the catalyst material can be contained in a fixed zone and the reactants caused to flow through such zone in contact with the solid catalyst. Only small, catalytic proportions of the copper halide-bearing material need be used, e.g. one percent or less based on the styrene, and the recovered catalyst can be reused repeatedly. Only negligible proportions of polymeric styrene are formed, particularly if the precautions hereinafter described are observed. Since the solid catalytic material is insoluble in the reaction mixture, the catalyst is readily separated from the reaction product. For example, coarse particles of solid catalyst can be retained in a reaction zone by a grid or screen; fine particles of solid catalyst can be separated from the product by decantation, filtration, centrifugation or other usual means.

The copper halide-bearing solid catalysts employed in the practice of this invention contain at the point of use an effective amount of a copper halide, i.e. copper chloride or copper bromide. Particularly effective catalysts for the purposes of this invention are ones that contain a cuprous halide, i.e. cuprous chloride or cuprous bromide. Cupric halides, i.e. cupric chloride and bromide, are also effective catalysts for the purposes of this invention, although sometimes less active than the cuprous halides under similar reaction conditions.

The halide in the copper halide-bearing catalyst can be different from, but is preferably the same as, the halide in the hydrogen halide reactant that is used, i.e. the catalyst in either the hydrochlorination or the hydrobromination reaction can contain either copper chloride or copper bromide. Preferably, a copper chloride-containing catalyst is used in hydrochlorination reactions, and a copper bromide-containing catalyst is used in hydrobromination reactions.

In preparing the catalyst to contain a copper halide at the point of use, the copper halide can be employed per se, or the same can be generated from elemental copper or from any compound of copper which reacts with hydrogen halide to produce a copper halide. In other words, the catalyst can be prepared from elemental copper or compounds of copper such as copper oxide, copper hydroxide, copper carbonate, copper sulfide, and copper salts of all kinds of acids as starting materials. Upon contact with a hydrogen halide, either prior to use or at the point of use in the process of the invention, such copper-containing compositions are converted at least in part to copper halide-containing catalysts.

The copper halide or copper halide-forming materials can be used per se in the process of the invention or can be supported in and/or on catalytically inactive supporting materials such as diatomaceous earth, coke, asbestos, inactive silicate clays, carborundum, or the like. For example, powdered cuprous chloride can be dispersed in a body of liquid monomeric styrene, or cuprous chloride deposited on finely divided diatomaceous earth can be similarly dispersed to function as a catalyst for hydrochlorination. Alternatively, larger pieces or molded pellets of catalyst material comprising elemental copper, copper halides, or copper halide-forming compounds can be packed into a column and styrene and hydrogen halide passed over the catalyst. The proportion of active copper halide material to the inactive mechanical support can be varied within wide limits, e.g. from a copper halide-bearing catalyst containing a mere trace of copper halide or copper halide-forming material to one consisting substantially of such materials. Usually, when supported catalysts are employed, they are made to contain from about 5 to about 50 percent by weight of active material, although smaller or larger proportions can be used. Catalysts comprising copper or copper compounds deposited in and/or on catalytically inactive carrier supports can be made in already known usual ways.

Because styrene is readily polymerized, it is expedient to exclude from the hydrohalogenation catalyst composition any material or combination of materials known to be catalytically active in the polymerization of styrene under the conditions of hydrohalogenation.

The hydrohalogenation of styrene compounds in the presence of copper halide-bearing solid catalysts according to this invention can be carried out at a reaction temperature between about 0° and about 50° C., preferably between about 20° and 50° C. At temperatures below 20° C., the rate of reaction is somewhat decreased and refrigeration is required to maintain the temperature, but such temperatures are sometimes advantageous for the hydrohalogenation of certain materials, such as divinylbenzene, which are very susceptible to polymerization. At temperatures above about 50° C., an appreciable amount of polymer sometimes forms in the reaction mixture. The reaction temperature is conveniently maintained between 20° and 50° C. and very satisfactory results are usually obtained with styrene and most other vinyl aromatic compounds by operating in this range. Suitable polymerization inhibitors can be added to the vinyl aromatic compound, if desired.

The process of the invention is usually carried out at atmospheric pressure although higher or lower pressures can be used.

The reaction can be carried substantially to completion, i.e., it can be continued until the monomeric styrene is substantially consumed in the reaction mixture, or the reaction may be interrupted short of this point. Unreacted styrene, if any, can be separated from the haloethylbenzene product and the latter be purified in usual ways, e.g. by fractional distillation.

The invention can be practiced in batch, semi-continuous or continuous fashion. For example, a suitable copper halide-bearing catalyst can be placed in a body of liquid monomeric styrene and hydrogen chloride bubbled therethrough. The catalyst may be finely divided and dispersed in the body of styrene, or a layer or bed of catalyst can be provided within the body of styrene and hydrogen chloride introduced within the catalyst bed or layer. Mechanical agitation of the liquid mass is usually desirable and can readily be provided by suitable stirrers, pumps and/or baffles. An excess of hydrogen chloride is usually employed and the unreacted portion vented to waste or conserved by recycling or by blowing into another similar batch of styrene reaction mixture. Styrene monomer can be fed into such a reaction mixture and an equivalent amount of the reaction mixture continuously withdrawn to provide a continuous process. If catalyst is withdrawn together with the reaction mixture, a compensating amount of catalyst can be fed in together with the monomeric styrene. This procedure can advantageously be adapted to a cascading series of reactors, passing monomeric styrene and hydrogen chloride through the series of reactors in countercurrent, i.e. feeding monomeric styrene (and catalyst if the catalyst is carried through with the reaction mixture) into the first of the series, passing the reaction mixture through the series from the first to the last reactor, feeding hydrogen chloride in excess into the last reactor and passing unreacted hydrogen chloride from each reactor through the next in the series to the first reactor.

A preferred continuous manner of practicing the invention comprises passing liquid monomeric styrene and gaseous hydrogen chloride together over a fixed bed of a suitable solid copper halide-bearing catalyst. For example, a gas absorption column can be packed with pieces of the solid catalytic material and styrene monomer and hydrogen chloride caused to flow over such catalyst, preferably in countercurrent. The styrene is usually fed into the top of a vertical column containing the catalyst and hydrogen chloride is fed into the bottom of the column, preferably through a suitable gas-distributing device, e.g. a gas sparger. The reaction mixture product is withdrawn from the bottom of the column and unreacted excess hydrogen chloride is vented from the top of the column. The proportion of chloroethylbenzene product in the effluent reaction mixture from a particular apparatus appears to be an inverse exponential function of the rate of feed of styrene and is independent of the rate of feed of hydrogen chloride, provided the latter is in excess. If the column is long enough and/or the rate of feed of styrene is slow enough, the effluent liquid product can be rich in, or consist substantially of, the chloroethylbenzene. Again, a cascading series of column reactors can be employed.

While the invention has been particularly described by reference to the hydrochlorination of styrene, it is applicable generally to the hydrohalogenation of vinyl aromatic compounds, i.e. aromatic compounds having a vinyl ($CH_2=CH-$) group attached to a carbon atom of an aromatic nucleus, particularly styrene compounds such as styrene itself, homologues of styrene, nuclear alkyl styrenes, and nuclear halogenated derivatives of such styrene hydrocarbons. Examples of suitable vinyl aromatic compounds are: styrene, ar-vinyltoluene, ar-vinylxylene, ar-ethylstyrene, divinylbenzene, vinylnaphthalene, ar-bromostyrene, ar-chlorostyrene, ar-dichlorostyrene, ar-vinylchlorotoluene, and the like. The vinyl aromatic compounds can be hydrohalogenated in the presence of other compounds which are not reactive with the hydrogen halide, such as the corresponding ethyl aromatic compounds. The invention is also applicable to the hydrobromination of such vinyl aromatic compounds with hydrogen bromide to form the corresponding bromoethyl aromatic compounds.

The following examples illustrate ways in which the invention has been practiced, but are not to be construed as limiting its scope.

EXAMPLE 1

Into a three-necked glass vessel, fitted with a gas bubbling tube, a mechanical stirrer and a vented vapor outlet, was charged a suspension of one part by weight of finely divided cuprous chloride in 100 parts by weight monomeric styrene. While the suspension was stirred and the temperature thereof was maintained at 20° C., a stream of hydrogen chloride gas was bubbled into the reaction mixture at a rate such that an unconsumed excess portion of hydrogen chloride was continuously vented from the reactor. The composition of the liquid reaction mixture was determined from time to time by measuring the density of a sample portion and reading from a calibration curve the proportion of 1-chloroethylbenzene corresponding to the observed density.

After two hours, the liquid reaction mixture contained 71 mole percent 1-chloroethylbenzene.

After four hours, the liquid reaction mixture contained 90 mole percent 1-chloroethylbenzene.

In contrast to these results, when the styrene alone (in the absence of added catalyst) was treated with hydrogen chloride by a procedure and under conditions similar to those just described, the liquid reaction mixture contained only 10 mole percent of 1-chloroethylbenzene after one hour and only 47 mole percent thereof after four hours.

EXAMPLE 2

A copper-bearing diatomaceous earth was prepared by impregnating broken lumps (average dimension about ¼-inch) of a diatomaceous earth with a concentrated cupric nitrate solution, drying and roasting the mixture, and reducing the copper oxide therein with hydrogen gas at a temperature of about 300° C. The resulting solid product contained approximately 32 percent by weight of elemental copper.

Six parts by weight of this material was stirred into 100 parts by weight of styrene and the mixture was treated at a temperature of 20° C. with an excess of hydrogen chloride by a procedure similar to that described in Example 1. After one hour, the liquid reaction mixture contained 54 mole percent of 1-chloroethylbenzene. At the completion of the test, the solid catalyst material was found to contain a considerable proportion of cuprous chloride.

In contrast to these results, when styrene alone (no added catalyst) was treated with hydrogen chloride as just described, the reaction mixture contained only 10 mole percent of 1-chloroethylbenzene after one hour.

EXAMPLE 3

Small scale continuous experiments were made in a 5/16-inch diameter by 11 and 1/2-inch water-jacketed glass column with a top dropping-funnel for feed of styrene and a bottom inlet for introduction of hydrogen chloride. The flows of reactants were countercurrent, a small excess of hydrogen chloride being vented at the top and product reaction mixture being withdrawn from the bottom of the column. In each experiment, the column was packed with pieces of diatomaceous earth having an average dimension of about 1/4-inch, on which was deposited a copper-containing material. Three such materials which were separately tested were as follows:

One of such copper-bearing materials, herein referred to as catalyst A, was described in Example 2 and contained, at the beginning of the test, 32 percent by weight of elemental copper on diatomaceous earth.

Another such material, herein referred to as catalyst B, contained 25 percent by weight cuprous chloride on diatomaceous earth and was prepared by soaking lumps of diatomaceous earth in a concentrated solution of cuprous chloride in hydrochloric acid, decanting off the excess liquid and drying the impregnated lumps by heating in a stream of nitrogen gas.

Another such material, herein referred to as catalyst C, contained 25 percent by weight cupric chloride on diatomaceous earth and was prepared by soaking lumps of diatomaceous earth in a concentrated solution of cupric chloride in hydrochloric acid, filtering, drying the lumps by heating to about 200° C. in an atmosphere of nitrogen and allowing the cooled catalyst to hydrate before use.

In a number of tests, sytrene was fed into the column at different rates and contacted with an excess of hydrogen chloride in the presence of one of the catalysts just described at a temperature of approximately 20° C. Samples of the column effluent liquid reaction mixture were taken from time to time, and these samples were analyzed.

In Table I, for each catalyst, is shown the proportion of 1-chloroethylbenzene contained in the effluent liquid reaction mixture corresponding to each rate of feed of styrene.

The table also shows the results of tests made with no catalyst, in which the reactor column was packed with 1/8-inch glass helices.

After the completion of the test, the solid material identified as catalyst A was found to contain a considerable proportion of cuprous chloride.

Table I

| Catalyst | Feed rate of styrene, ml. per minute | 1-chloro-ethylbenzene in product, mole percent |
|---|---|---|
| "A" (reduced copper [1] on diatomaceous earth) | 0.23 | 58 |
| | 0.57 | 32 |
| | 1.00 | 19 |
| | 1.85 | 12 |
| "B" (Cu₂Cl₂ on diatomaceous earth) | 0.36 | 37 |
| | 0.47 | 32 |
| | 0.53 | 28 |
| | 0.89 | 21 |
| | 1.92 | 14 |
| | 8.70 | 7 |
| "C" (CuCl₂ on diatomaceous earth) | 0.43 | 18 |
| | 0.58 | 15 |
| | 0.84 | 12 |
| | 0.98 | 10 |
| | 3.8 | 5 |
| Blank (no catalyst) | 0.46 | 11 |
| | 0.60 | 7 |
| | 0.94 | 6 |

[1] At least partially converted to cuprous chloride during the test.

EXAMPLE 4

A material similar to that described in Example 2, having about 32 percent by weight reduced copper deposited on lumps of diatomaceous earth and having an average dimension of about 1/4-inch, was packed into a 2-inch diameter by 72-inch long gas absorption column having a cooling water jacket. Monomeric styrene was fed into the top of the column and hydrogen chloride was bubbled into the bottom of the column through a gas sparger. The rate of hydrogen chloride feed was adjusted so that a small excess of unreacted hydrogen chloride was continuously vented from the top of the column. The liquid reaction mixture was continuously withdrawn from the bottom of the column. When the operation had been continued long enough for equilibrium and a steady state to be established, samples were taken of the effluent liquid reaction product, which was observed to have a temperature of about 50° C. In Table II, the proportion of 1-chloroethylbenzene in the effluent liquid reaction mixture product is shown for each of two rates of feed of styrene.

Table II

| Feed rate of styrene, liters per hour | 1-chloro-ethylbenzene in product, mole percent |
|---|---|
| 2.40 | 73 |
| 0.91 | 87 |

At the conclusion of the test, the solid catalyst material was found to contain a considerable proportion of cuprous chloride.

In place of the catalysts employed in the foregoing examples, there can be used ones that contain copper bromides. As starting materials there can be used other compounds of copper that are capable of reaction with hydrogen halides to generate a copper halide. In place of styrene there can be used another styrene compound such as a nuclear alkyl styrene or a nuclear halogenated derivative of such styrene hydrocarbons. In place of hydrogen chloride there can be used hydrogen bromide. In each instance, the hydrohalogenation of the styrene compound proceeds at a rate advantageously faster in the presence of the copper halide-containing catalyst than in its absence.

That which is claimed is:

1. A method which comprises making a haloethylbenzene compound by interacting a styrene compound in liquid form and selected from the group consisting of styrene, nuclear alkyl styrenes, and nuclear halogenated derivatives of the styrene hydrocarbons just mentioned and a hydrogen halide selected from the group consisting of hydrogen chloride and hydrogen bromide in the presence of an insoluble solid catalyst containing a copper halide selected from the group consisting of copper chlorides and copper bromides at a reaction temperature between 0° and 50° C.

2. A method according to claim 1 wherein the hydrogen halide is hydrogen chloride.

3. A method according to claim 2 wherein the copper halide is a copper chloride.

4. A method according to claim 2 wherein the copper halide is cuprous chloride.

5. A method which comprises making a 1-haloethylbenzene by interacting styrene in liquid form and a hydrogen halide selected from the group consisting of hydrogen chloride and hydrogen bromide in the presence of an insoluble solid catalyst containing a copper halide selected from the group consisting of copper chlorides and copper bromides at a reaction temperature between 0° and 50° C.

6. A method according to claim 5 wherein the hydrogen halide is hydrogen chloride.

7. A method according to claim 6 wherein the copper halide is a copper chloride.

8. A method which comprises making 1-chloroethylbenzene by interacting styrene in liquid form and hydrogen chloride in the presence of an insoluble solid catalyst containing cuprous chloride at a reaction temperature between 0° and 50° C.

9. A method which comprises making 1-chloroethylbenzene by passing styrene in liquid form and hydrogen chloride in countercurrent in contact with an insoluble solid catalyst containing cuprous chloride at a reaction temperature between 0° and 50° C.

References Cited in the file of this patent

UNITED STATES PATENTS

| | | |
|---|---|---|
| 2,328,275 | Heard | Aug. 31, 1943 |
| 2,446,124 | Boyd | July 27, 1948 |

FOREIGN PATENTS

| | | |
|---|---|---|
| 435,858 | Great Britain | Oct. 1, 1935 |